United States Patent
Muller et al.

(10) Patent No.: US 6,816,467 B1
(45) Date of Patent: Nov. 9, 2004

(54) SPANNING TREE SUPPORT IN A HIGH PERFORMANCE NETWORK DEVICE

(75) Inventors: Shimon Muller, Sunnyvale, CA (US); Ariel Hendel, Cupertino, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/418,209

(22) Filed: Oct. 13, 1999

Related U.S. Application Data

(63) Continuation of application No. 08/885,001, filed on Jun. 30, 1997, now Pat. No. 6,081,512.

(51) Int. Cl.[7] .............................................. H04L 12/28
(52) U.S. Cl. ...................................... 370/256; 370/390
(58) Field of Search ................................ 370/256, 390, 370/432, 400, 401; 714/2–4

(56) References Cited

U.S. PATENT DOCUMENTS

| | | | | |
|---|---|---|---|---|
| 5,315,592 A | * | 5/1994 | Conant et al. ............... | 370/401 |
| 5,386,414 A | * | 1/1995 | Chou et al. .................. | 370/389 |
| 5,764,636 A | * | 6/1998 | Edsall .......................... | 370/401 |
| 5,790,808 A | * | 8/1998 | Seaman ....................... | 709/223 |
| 5,825,772 A | * | 10/1998 | Dobbins et al. ............ | 370/396 |
| 5,949,788 A | * | 9/1999 | Friedman et al. ........... | 370/431 |
| 5,959,989 A | * | 9/1999 | Gleeson et al. ............. | 370/390 |

* cited by examiner

Primary Examiner—Ajit Patel
Assistant Examiner—Chirag Shah
(74) Attorney, Agent, or Firm—Blakely, Sokoloff, Taylor & Zafman

(57) ABSTRACT

A method and apparatus for providing spanning tree support are provided. According to one aspect of the present invention, a network device includes two or more ports that are part of a trunk. One of the two or more ports are selected for participation in a loop-free topology discovery protocol. Then, the loop-free topology discovery protocol is executed for the selected port. If the loop-free topology discovery protocol indicates the selected port is to be blocked, then all of the ports of the trunk are blocked. According to another aspect of the present invention, a set of states for association with each port of a network device is provided. The set of states includes a "blocked" state in which both learning and forwarding are inhibited, a "learn only" state in which learning is permitted and forwarding remains inhibited, and a "non-blocked" state in which both learning and forwarding are permitted. Responsive to an indication from a loop-free topology discovery protocol that a port of the network device is to be unblocked, a state associated with the first port is set to the "learn only" state for a predetermined amount of time. Then, after the predetermined amount of time, the state associated with the first port is set to the "non-blocked" state.

7 Claims, 8 Drawing Sheets

SPANNING TREE SUPPORT IN A HIGH PERFORMANCE NETWORK DEVICE

This is a continuation of application Ser. No. 08/885,001, filed on Jun. 30, 1997, Now U.S. Pat. No. 6,081,572.

FIELD OF THE INVENTION

The invention relates generally to the field of computer networking devices. More particularly, the invention relates to improved spanning tree support in an IEEE 802.1d compliant network device building block.

BACKGROUND OF THE INVENTION

The Institute of Electrical and Electronics Engineers (IEEE) has developed a network communication standard 802.1d entitled, "Media Access Control (MAC) Bridges," approved May 31, 1990 (hereinafter "IEEE 802.1d"). In brief, IEEE 802.1d describes functions to be performed by compliant bridges including a Spanning Tree Protocol, building and maintenance of a filtering database, relaying and filtering of frames, and transmission of Bridge Protocol Data Units (BPDUs). A BPDU is a special message that bridges transmit to each other to facilitate determination of a spanning tree. The Spanning Tree Protocol's primary function is to prevent loops in the bridged network. The Spanning Tree Protocol does this by enabling and disabling certain ports on a network device based upon negotiations with neighboring devices.

Several limitations of learning bridges in the prior art have been observed by the assignee of the present invention. For example, a port's transition from the blocked state to the non-blocked state may cause attached subnets to be flooded with packets that are addressed to nodes belonging to those subnets. This flooding results in less than efficient operation of the learning bridge. Additionally, the conventional port-level approach to the Spanning Tree Protocol employed by prior art learning bridges is incompatible with the concept of trunking.

Generally, trunking can be thought of as a means of providing bandwidth aggregation between two points in a network (e.g., between two network devices). The multiple physical network links coupling two devices, for example, may be combined to form one logical channel, referred to as a "trunk," between the first device and the second device. As far as the Spanning Tree Protocol is concerned, a trunk is a loop. Thus, the conventional port-level approach will block at least N-1 ports of an N-port trunk to eliminate the perceived loop.

Based on the foregoing, it is desirable to provide a network device that provides more intelligent spanning tree processing. Specifically, it is desirable to perform the Spanning Tree Protocol at a trunk-level rather than at the port-level, such that all ports of a trunk are treated in a like manner with respect to the Spanning Tree Protocol. It is also desirable to provide one or more intermediate states to facilitate a port's transition from the blocked state to the non-blocked state to reduce flooding. Further, it would be advantageous to provide improved methods of BPDU reception and transmission.

SUMMARY OF THE INVENTION

A method and apparatus for providing spanning tree support are described. According to one aspect of the present invention, a network device includes two or more ports that are part of a trunk. One of the two or more ports are selected for participation in a loop-free topology protocol. Then, the loop-free topology discovery protocol is executed for the selected port. If the loop-free topology discovery protocol indicates the selected port is to be blocked, then all of the ports of the trunk are blocked.

According to another aspect of the present invention, a set of states for association with each port of a network device is provided. The set of states includes a "blocked" state in which both learning and forwarding are inhibited, a "learn only" state in which learning is permitted and forwarding remains inhibited, and a "non-blocked" state in which both learning and forwarding are permitted. Responsive to an indication from a loop-free topology discovery protocol that a port of the network device is to be unblocked, a state associated with the first port is set to the "learn only" state for a predetermined amount of time. Then, after the predetermined amount of time, the state associated with the first port is set to the "non-blocked" state. This aspect of the present invention allows a port to begin learning prior to actively participating in normal forwarding/bridging of traffic. Advantageously, transitioning to the learn only state prior to transitioning to the not blocked state for a temporary period of time reduces flooding.

According to a further aspect of the present invention, a blocked port is configured to receive configuration messages by providing an input interface address register in each ports of a network device. The input address register for filtering addresses that do not match an address contained therein. A loop-free topology discovery protocol is executed for a port of the network. If the loop-free topology discovery protocol indicates the port is to be blocked, then a multicast address associated with configuration messages is written into the input interface address register of the port. In this manner, the first port will subsequently accept configuration messages while filtering all other packets.

According to another aspect of the present invention, configuration messages may be forwarded over blocked ports of a network device. A central processing unit (CPU) generates a configuration message and a corresponding set of control information. The control information includes a directed mode flag indicating whether or not packet header matching is to be avoided. The control information also including information regarding an output port to which the configuration message is to be transferred. The specified output port being a port that has previously been blocked by a loop-free topology discovery protocol. After generating the configuration message, the CPU transfers the configuration message and the corresponding set of control information to the network device for transmission. Based upon the directed mode flag, a CPU interface forwards the configuration message to the specified output port.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A method and apparatus are described for providing spanning tree support in a network device. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention includes various steps, which will be described below. The steps can be embodied in machine-executable instructions, which can be used to cause a general-purpose or special-purpose processor programmed with the instructions to perform the steps. Alternatively, the steps of the present invention might be performed by specific hardware components that contain hardwired logic for performing the steps, or by any combination of programmed computer components and custom hardware components.

While the method of the present invention provides improved spanning tree support for the IEEE 802.1d Spanning Tree Protocol, it is readily apparent that the process is applicable not only to the IEEE 802.1d Spanning Tree Protocol, but to any loop-free topology discovery protocol that seeks to eliminate and/or prevent network topology loops.

Trunking Overview

As discussed above, trunking can generally be thought of as a means of providing bandwidth aggregation between two points in a network.

Figure 1:
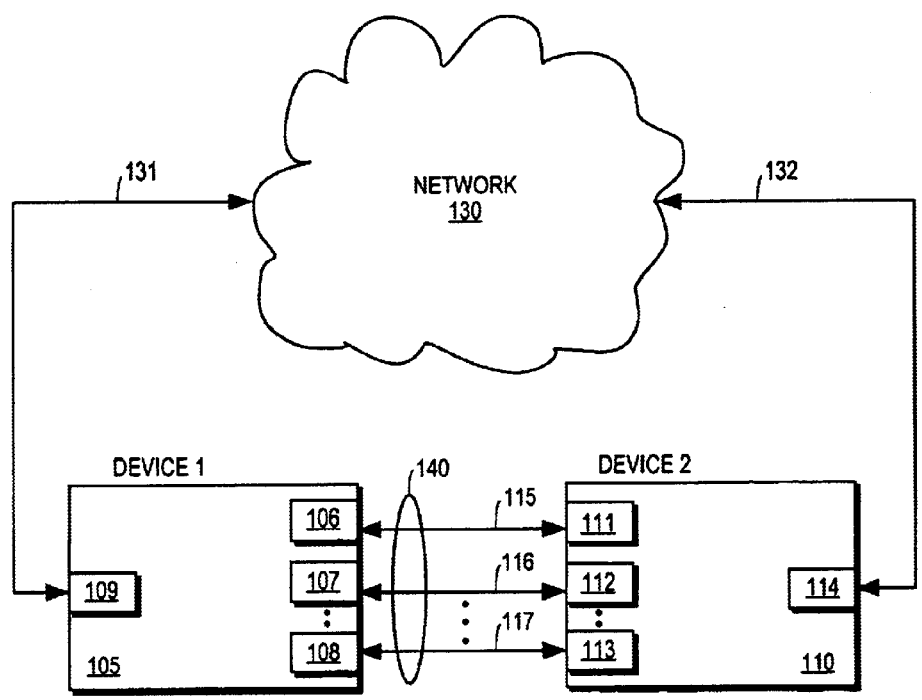
FIG. 1 illustrates two devices coupled in communication via a trunk.

Referring to FIG. 1, a first device 105 and a second device 110 are connected through a plurality of physical network links 115–117. The first device 105 and the second device 110 may be network devices, such as a server, client, repeater, bridge, router, brouter, switch, or the like. The first device 105 includes ports 106–109 and the second device 110 includes ports 111–114. The ports provide the device with access to the attached network link by implementing appropriate network protocols such as the Ethernet protocol. In this example, the physical network links 115–117 have been combined to form one logical channel, a "trunk" 140, between the first device 105 and the second device 110.

Since a trunk by definition provides multiple physical routes between two given nodes in a network, it is considered to be a loop from the Spanning Tree Protocol's perspective. Therefore, the Spanning Tree Protocol will disable at least two of the three links of trunk 140.

An Exemplary Network Element

Figure 2:
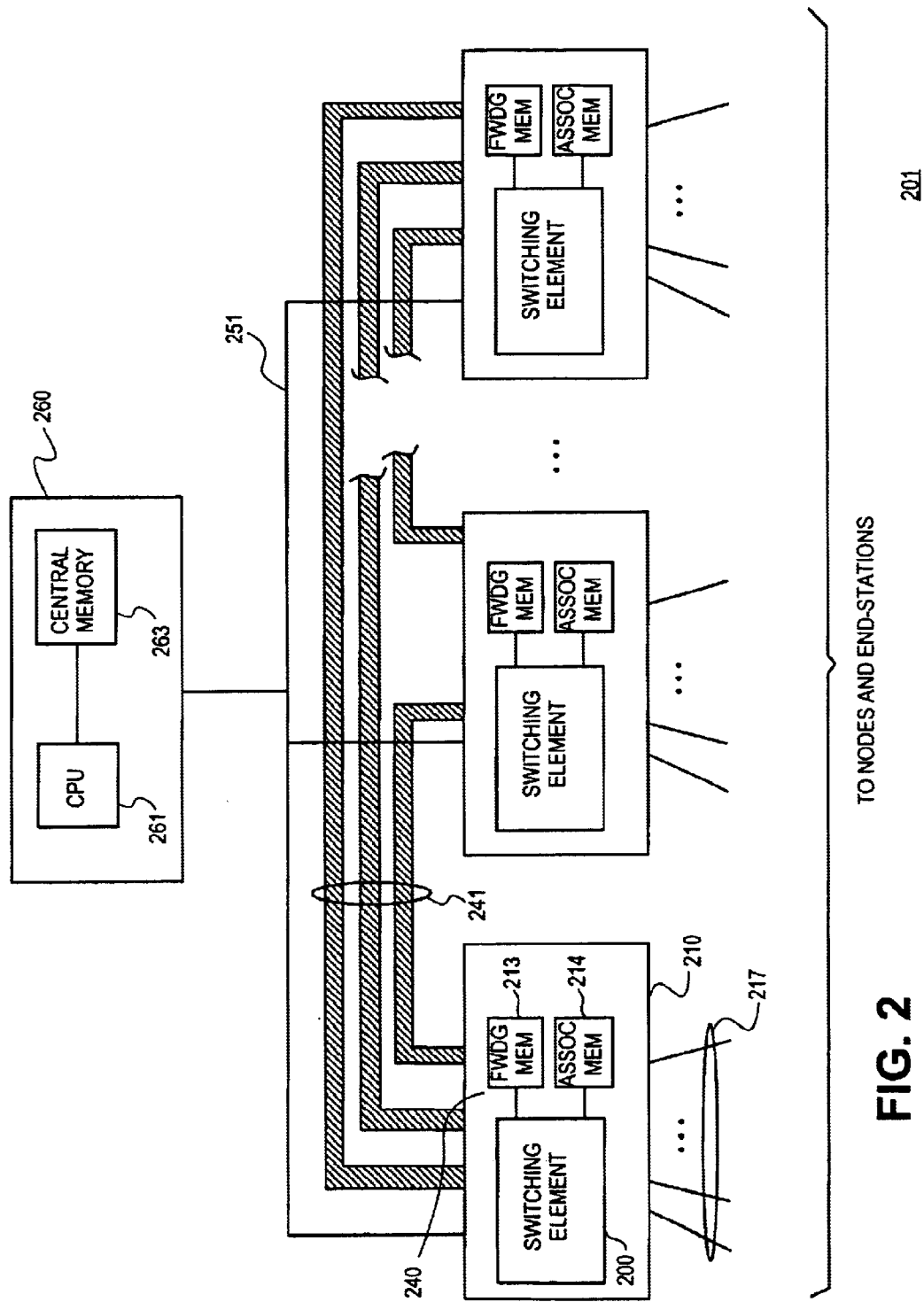
FIG. 2 is a simplified block diagram of an exemplary network element that incorporates the teachings of the present invention.

An overview of one embodiment of a network element that operates in accordance with the teachings of the present invention is illustrated in FIG. 2. The network element is used to interconnect a number of nodes and end-stations in a variety of different ways. In particular, an application of the multi-layer distributed network element (MLDNE) would be to route packets according to predefined routing protocols over a homogenous data link layer such as the IEEE 802.3 standard, also known as the Ethernet. Other routing protocols can also be used.

The MLDNE's distributed architecture can be configured to route message traffic in accordance with a number of known or future routing algorithms. In a preferred embodiment, the MLDNE is configured to handle message traffic using the Internet suite of protocols, and more specifically the Transmission Control Protocol (TCP) and the Internet Protocol (IP) over the Ethernet LAN standard and medium access control (MAC) data link layer. The TCP is also referred to here as a Layer 4 protocol, while the IP is referred to repeatedly as a Layer 3 protocol.

In one embodiment of the MLDNE, a network element is configured to implement packet routing functions in a distributed manner, i.e., different parts of a function are performed by different subsystems in the MLDNE, while the final result of the functions remains transparent to the external nodes and end-stations. As will be appreciated from the discussion below and the diagram in FIG. 2, the MLDNE has a scalable architecture which allows the designer to predictably increase the number of external connections by adding additional subsystems, thereby allowing greater flexibility in defining the MLDNE as a stand alone router.

As illustrated in block diagram form in FIG. 2, the MLDNE 201 contains a number of subsystems 210 that are fully meshed and interconnected using a number of internal links 241 to create a larger switch. At least one internal link couples any two subsystems. Each subsystem 210 includes a switch element 200 coupled to a forwarding and filtering database 240, also referred to as a forwarding database. The forwarding and filtering database may include a forwarding memory 213 and an associated memory 214. The forwarding memory (or database) 213 stores an address table used for matching with the headers of received packets. The associated memory (or database) stores data associated with each entry in the forwarding memory that is used to identify forwarding attributes for forwarding the packets through the MLDNE. A number of external ports (not shown) having input and output capability interface the external connections 217. In one embodiment, each subsystem supports multiple Gigabit Ethernet ports, Fast Ethernet ports and Ethernet ports. Internal ports (not shown) also having input and output capability in each subsystem couple the internal links 241. Using the internal links, the MLDNE can connect multiple switching elements together to form a multigigabit switch.

The MLDNE 201 further includes a central processing system (CPS) 260 that is coupled to the individual subsystem 210 through a communication bus 251 such as the peripheral components interconnect (PCI). The CPS 260 includes a central processing unit (CPU) 261 coupled to a central memory 263. Central memory 263 includes a copy of the entries contained in the individual forwarding memories 213 of the various subsystems. The CPS has a direct control and communication interface to each subsystem 210 and provides some centralized communication and control between switch elements.

An Exemplary Switch Element

Figure 3:
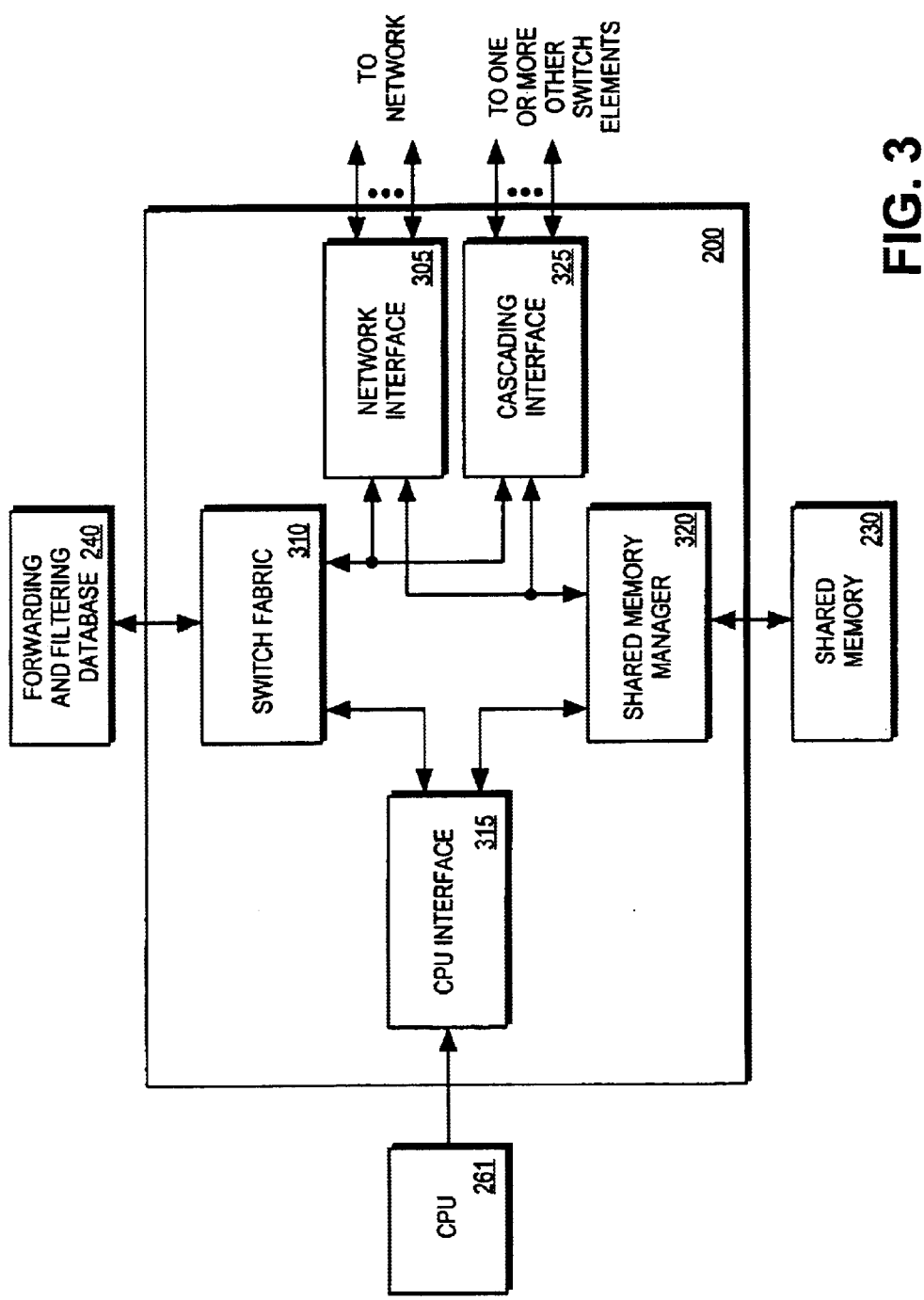
FIG. 3 is a simplified block diagram of an exemplary switch element that may be utilized in the switch of FIG. 2.

FIG. 3 is a simplified block diagram illustrating an exemplary architecture of the switch element of FIG. 2. The switch element 200 depicted includes a central processing unit (CPU) interface 315, a switch fabric block 310, a network interface 305, a cascading interface 325, and a shared memory manager 320.

Ethernet packets may enter or leave the network switch element 200 through any one of the three interfaces 305, 315, or 325. In brief, the network interface 305 operates in accordance with a corresponding Ethernet protocol to receive Ethernet packets from a network (not shown) and to transmit Ethernet packets onto the network via one or more external ports (not shown). An optional cascading interface 325 may include one or more internal links (not shown) for interconnecting switching elements to create larger switches. For example, each switch element may be connected together with other switch elements in a full mesh topology to form a multi-layer switch as described above. Alternatively, a switch may comprise a single switch element 200 with or without the cascading interface 325.

The CPU 261 may transmit commands or packets to the network switch element 200 via the CPU interface 315. In this manner, one or more software processes running on the CPU may manage entries in an external forwarding and filtering database 240, such as adding new entries and invalidating unwanted entries. In alternative embodiments, however, the CPU may be provided with direct access to the forwarding and filtering database 240. In any event, for purposes of packet forwarding, the CPU port of the CPU interface 315 resembles a generic input port into the switch element 200 and may be treated as if it were simply another external network interface port. However, since access to the CPU port occurs over a bus such as a peripheral components interconnect (PCI) bus, the CPU port does not need any media access control (MAC) functionality.

Returning to the network interface 305, the two main tasks of input packet processing and output packet processing will now briefly be described. Input packet processing may be performed by one or more input ports of the network interface 305. Input packet processing includes the following: (1) receiving and verifying incoming Ethernet packets, (2) modifying packet headers when appropriate, (3) requesting buffer pointers from the shared memory manager 320 for storage of incoming packets, (4) requesting forwarding decisions from the switch fabric block 310, (5) transferring the incoming packet data to the shared memory manager 320 for temporary storage in an external shared memory 230, and (5) upon receipt of a forwarding decision, forwarding the buffer pointer(s) to the output port(s) indicated by the forwarding decision. Output packet processing may be performed by one or more output ports of the network interface 305. Output processing includes requesting packet data from the shared memory manager 320, transmitting packets onto the network, and requesting deallocation of buffer(s) after packets have been transmitted.

The network interface 305, the CPU interface 315, and the cascading interface 325 are coupled to the shared memory manager 320 and the switch fabric block 310. Preferably, critical functions such as packet forwarding and packet buffering are centralized as shown in FIG. 3. The shared memory manager 320 provides an efficient centralized interface to the external shared memory 230 for buffering of incoming packets. The switch fabric block 310 includes a search engine and learning logic for searching and maintaining the forwarding and filtering database 240 with the assistance of the CPU.

The centralized switch fabric block 310 includes a search engine that provides access to the forwarding and filtering database 240 on behalf of the interfaces 305, 315, and 325. Packet header matching, Layer 2 based learning, Layer 2 and Layer 3 packet forwarding, filtering, and aging are exemplary functions that may be performed by the switch fabric block 310. Each input port is coupled with the switch fabric block 310 to receive forwarding decisions for received packets. The forwarding decision indicates the outbound port(s) (e.g., external network port or internal cascading port) upon which the corresponding packet should be transmitted. Additional information may also be included in the forwarding decision to support hardware routing such as a new MAC destination address (DA) for MAC DA replacement. Further, a priority indication may also be included in the forwarding decision to facilitate prioritization of packet traffic through the switch element 200.

In the present embodiment, Ethernet packets are centrally buffered and managed by the shared memory manager 320. The shared memory manager 320 interfaces every input port and output port and performs dynamic memory allocation and deallocation on their behalf, respectively. During input packet processing, one or more buffers are allocated in the external shared memory 230 and an incoming packet is stored by the shared memory manager 320 responsive to commands received from the network interface 305, for example. Subsequently, during output packet processing, the shared memory manager 320 retrieves the packet from the external shared memory 230 and deallocates buffers that are no longer in use. To assure no buffers are released until all output ports have completed transmission of the data stored therein, the shared memory manager 320 preferably also tracks buffer ownership.

The present invention may be included in a switch element such as switch element 200. However, the method and apparatus described herein are equally applicable to other types of network devices such as repeaters, bridges, routers, brouters, and other network devices.

Spanning Tree Learning and Filtering

Figure 4:
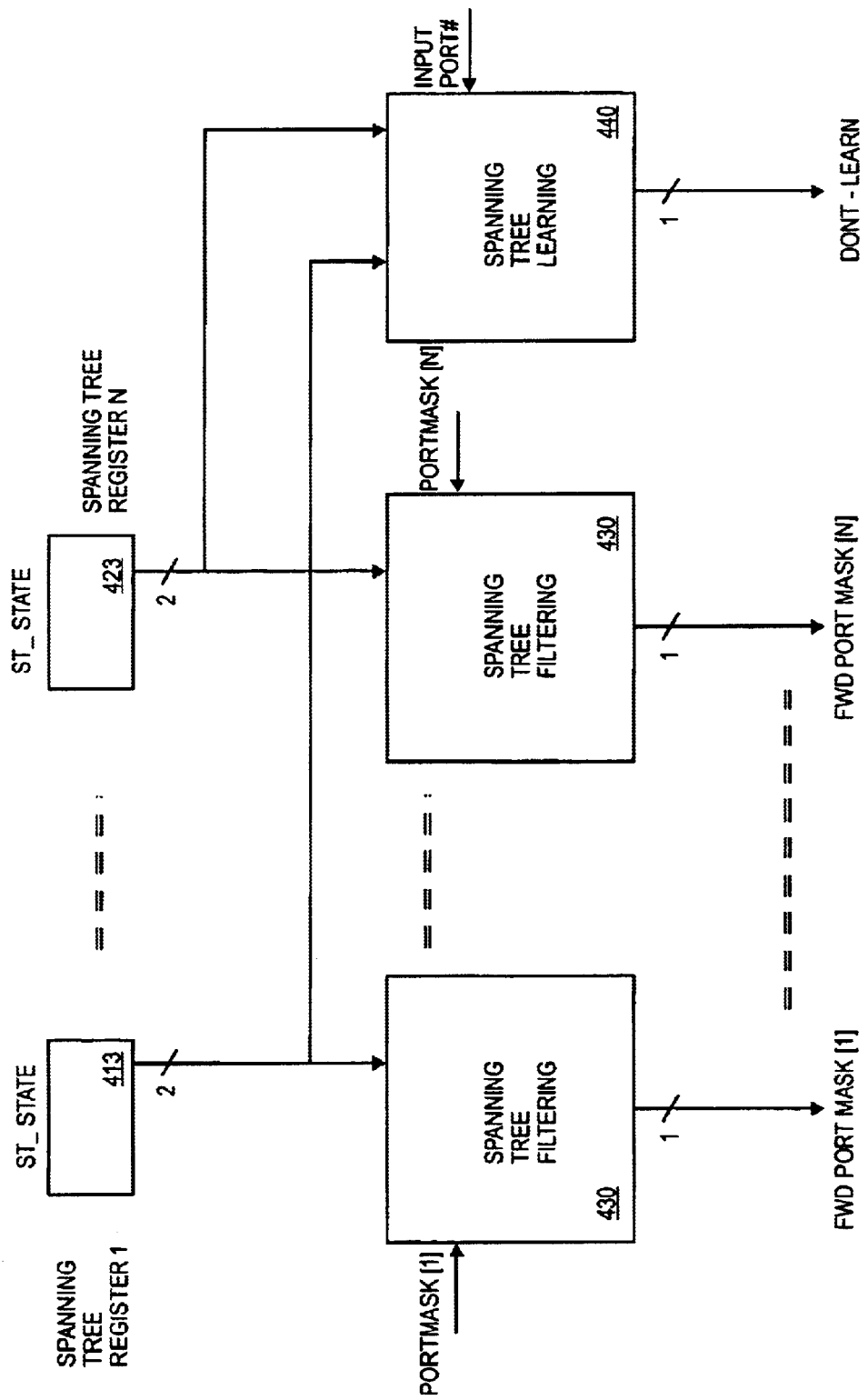
FIG. 4 is a block diagram which illustrates the interaction of spanning tree filtering circuitry and spanning tree learning circuitry according to one embodiment of the present invention.

The spanning tree logic of FIG. 4 performs output packet filtering and inhibits learning under certain circumstances. However, before discussing the spanning tree logic, filtering and learning are briefly addressed.

Filtering is the process of selectively discarding packets in the switch without losing the required connectivity. With respect to forwarding, when a port is in one of the two blocked states defined herein, any packets destined for nodes on that port's subnet are filtered.

Layer 2 based learning is the process of constantly updating the media access control (MAC) address portion of the forwarding database based on the traffic that passes through the switching device. When a packet enters the switching device, an entry is created (or an existing entry is updated) in the database that correlates the MAC source address of the packet with the input port upon which the packet arrived. In this manner, the switching device learns upon which subnet a given node resides.

As will be discussed in more detail below, when an input port is in either of two non-blocked states with respect to learning the switching element may perform learning based upon the source address of the received packet. However, in a third state, no learning takes place.

FIG. 4 is a block diagram of spanning tree learning and filtering logic within the switch fabric 310 according to one embodiment of the present invention. In this embodiment, a spanning tree register is provided for each of N ports. Port 1 corresponds to a first spanning tree register 413, Port N corresponds to the last trunk register 423. A spanning tree state may be provided for each port to indicate whether or not the Spanning Tree protocol has blocked the particular port or whether the port remains free to receive and transmit packets. In this example, the spanning tree registers 413–423 include a two bit ST_State field that may store one of three spanning tree states: "blocked," "non-blocked," and "learn only" which will be discussed further below. While, for purposes of this example, the spanning tree state information has been described as being stored in registers, it will be recognized that numerous other storage mechanisms are possible.

The spanning tree learning and filtering logic of the present invention also includes a spanning tree filter block 430 for each port and a common spanning tree learning block 440. The registers are coupled to the corresponding filter block 430 and the learning block 440 to provide the spanning tree state information to these blocks.

According to the present embodiment, during the learning process, the learning block 440 produces a one bit dont_learn flag. As may be apparent from the name, in a first state, the dont_learn flag indicates that no learning should take place with respect to the current packet. Logic internal to the learning block 440 determines whether or not learning is enabled for the input port. It may be that the port is blocked or has been directed not to perform learning by the Spanning Tree Protocol, for example. This determination may be made with reference to the spanning tree state in the ST_State register corresponding to the input port. If learning is enabled on the input port, processing the dont_learn line will be logic zero, otherwise the dont_learn line will be a logic 1.

In this embodiment, a set of N bits may be used to encode a forwarding port mask for N ports. When the bit in position X of the set of N bits is in a forward state, the packet is to be forwarded to port X. However, when the bit is in a filter state, the packet is to be filtered. Of course, those of ordinary skill in the art will appreciate that alternative representations may be used.

In any event, during the forwarding process, each filter block 430 receives as an input the port mask from the forwarding database 240. In alternative embodiments, the port mask received by the spanning tree filtering blocks may be an intermediate value. That is, the port mask may have already been altered by one or more other filtering processes prior to arriving at the spanning tree filter block 430. Each spanning tree filter block 430 contributes a bit toward the forwarding port mask (e.g., FwdPortMask[N:1]) that is ultimately communicated to the input port that requested the forwarding decision for this particular packet. The spanning tree filtering block 430 allows only packets destined to "non-blocked" output ports to be forwarded by comparing the ST_State of the corresponding port with the "non-blocked" encoding. Thus, the spanning tree filtering block output for a particular port will be the forward state if the port's ST_State is not blocked with respect to output; otherwise the output will be the filter state.

Spanning Tree Progressing

Figure 5:
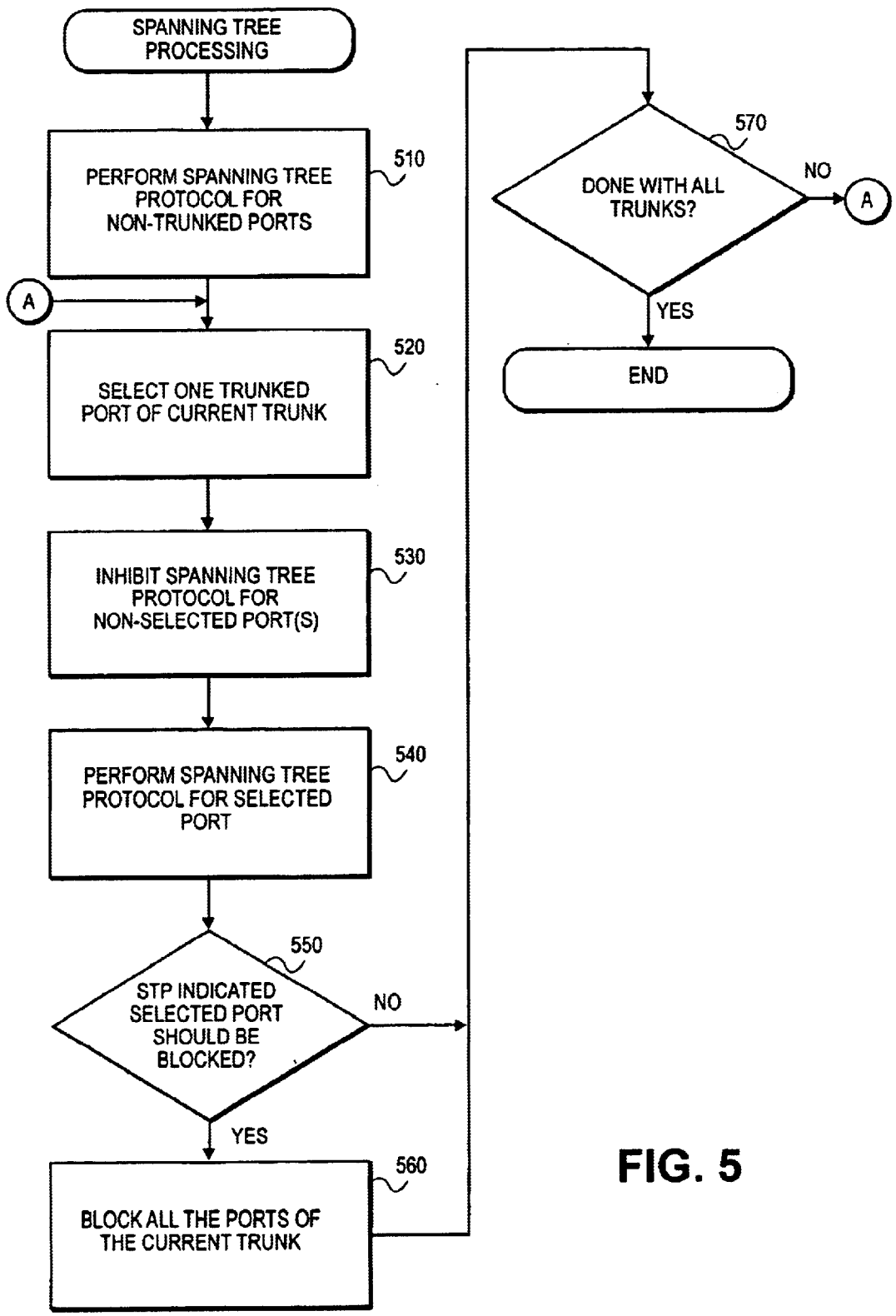
FIG. 5 is a flow diagram illustrating spanning tree processing according to one embodiment of the present invention.

FIG. 5 is a flow diagram illustrating spanning tree processing according to one embodiment of the present invention. At step 510, the conventional Spanning Tree Protocol is performed for each port that is not participating in a trunk, if any. For example, configuration BPDUs are exchanged with other networking devices on the network to determine the root bridge and the designated bridge as described in IEEE 802.1d. The details of the Spanning Tree Protocol such as the format of configuration BPDUs and timer values are not necessary for understanding the present invention. However, such information is available in IEEE 802.1d.

Steps 520–540, perform the improved trunk-level spanning tree processing. At step 520, a single port is selected of the trunked ports with which to perform the Spanning Tree Protocol. For example, the port with the smallest port number may be selected. At step 530, spanning tree processing is inhibited on the non-selected trunked ports. For example, formation of configuration BPDUs may be inhibited. It is appreciated that other methods of excluding non-selected ports are available.

At step 540, the Spanning Tree Protocol is performed using the port selected in step 520. At step 550, it is determined if the selected port is to be blocked by the Spanning Tree Protocol. If so, at step 560, all ports of the trunk in which the selected port is participating are blocked. Otherwise, all the ports of the trunk will remain non-blocked and processing continues with step 570.

At step 570, a test is performed to determine if all trunks have been processed. If so, then trunk-level spanning tree processing is complete; otherwise, processing continues with step 520. In this manner, trunks are treated as the unit of operation for purposes of the Spanning Tree Protocol rather than ports. Advantageously, all trunked ports of a given trunk will have the same spanning tree state.

Importantly, in accommodating trunking and the IEEE 802.1d Spanning Tree Protocol, the assignee of the present invention has found it advantageous to treat individual ports as trunks of size one. This simplifying assumption may be employed to simplify or eliminate portions of the processing described above. For example, in alternative embodiments, step 510 can be bypassed. That is, rather than treating individual ports as a special case, all ports may be treated as trunks.

Returning to step 520, it will be recognized that numerous other ways of selecting a single port of a plurality of trunked ports are available. The actual manner of selecting the port is not as important as limiting the application of the Spanning Tree Protocol to a single port of each trunk. While it may be advantageous to select a port in a particular manner for specific implementations, it is appreciated that any manner of selecting a port in a trunk will suffice for purposes of the processing described above.

Note that in alternative embodiments, the additional "learn only" state described below may also be employed rather than limiting the ports to the two conventional "blocked" and "non-blocked" states.

Configuration Message Reception

Before describing an exemplary process for configuration message reception utilized by the present invention, the filtering logic within network interface ports will briefly be outlined. Each port of the network interface 305 includes a media access controller (MAC). With respect to incoming packet traffic, the MAC serves as an input interface. The MAC may be programmed to selectively receive incoming packets. For this purpose the MAC includes MAC address filtering logic. The MAC address filtering logic includes a MAC address register and a MAC address comparator. Based upon the state of the MAC (e.g., promiscuous mode) and the address that has been programmed into the MAC address register, the MAC address filtering logic will receive incoming packets addressed to a specific address and filter others or receive all incoming packets. Typically, the MAC address register will contain the unicast MAC address of the port. In this manner, incoming packets addressed to the appropriate MAC address are allowed to enter the switching element 200 through the MAC. However, all other packets are filtered (e.g., dropped).

When an incoming packet is received, the MAC filtering logic compares the packet's MAC destination address (DA) to the value in the MAC address register. If the MAC DA matches, the packet will be received by the switching element 200, otherwise the packet is filtered.

Figure 6:
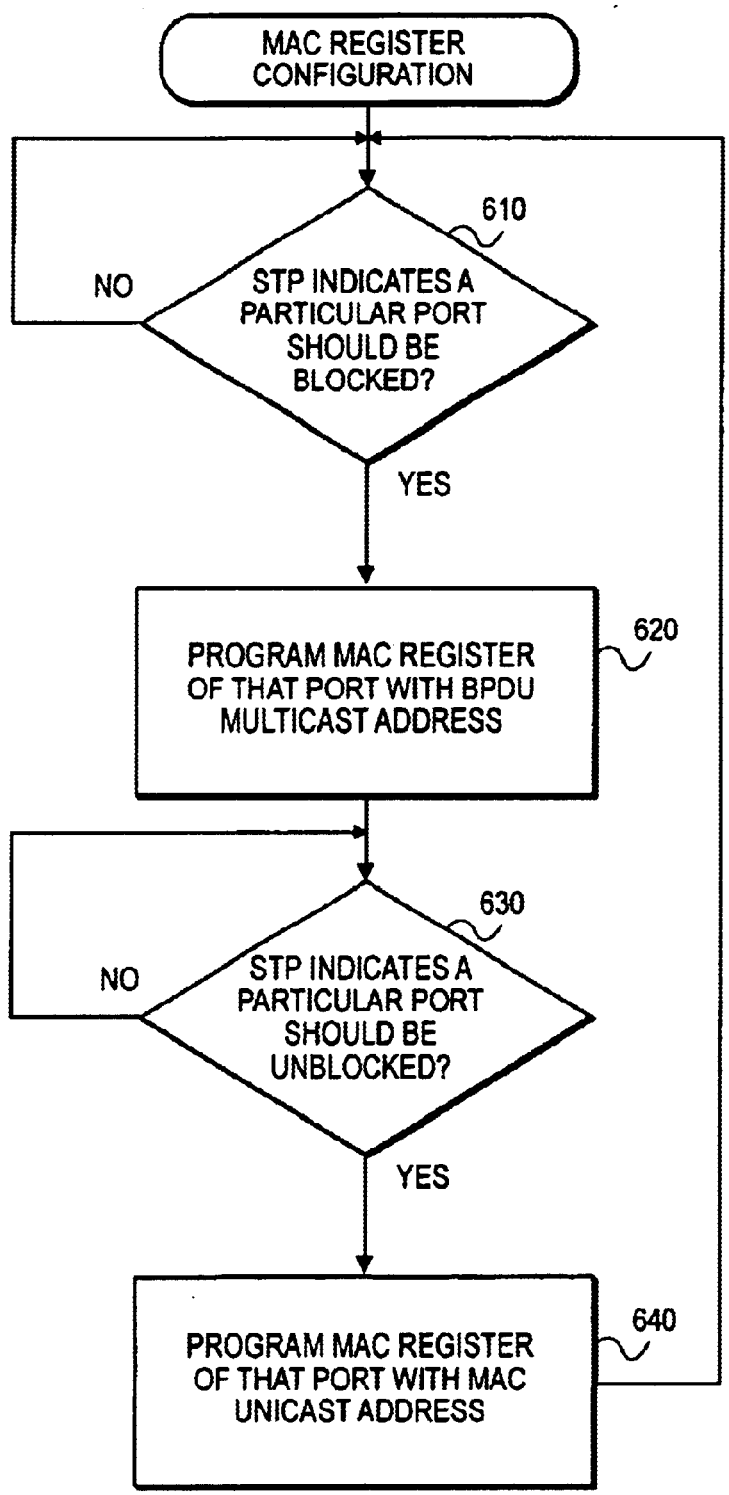
FIG. 6 is a flow diagram illustrating media access control (MAC) address register configuration according to one embodiment of the present invention.

Referring now to FIG. 6, a flow diagram illustrates MAC address register configuration according to one embodiment of the present invention. Configuration messages such as BPDUs typically need to be exchanged among devices that are acting as bridges within a network. This is often so even when a particular port has been blocked by the Spanning Tree Protocol, for example. Thus, a mechanism for blocking other packet traffic while allowing BPDUs to be received over blocked ports is needed and such a mechanism will now be described.

At step 610, a determination is made by the Spanning Tree Protocol that a port should be blocked. At step 620, the address to which BPDUs are transmitted is programmed into the MAC address register. Programming the BPDU multicast address into the MAC address register has the effect of causing all packet traffic other than BPDUs to be filtered. Thus, BPDUs can still be received when a port is in a blocked state; thereby allowing BPDUs to continue to be processed by the CPU, for example.

At step 630, a determination is made by the Spanning Tree Protocol that a port should be unblocked. At step 640, the MAC unicast address is programmed into the MAC address register.

CPU Originated Packet Transmission

Figure 7:
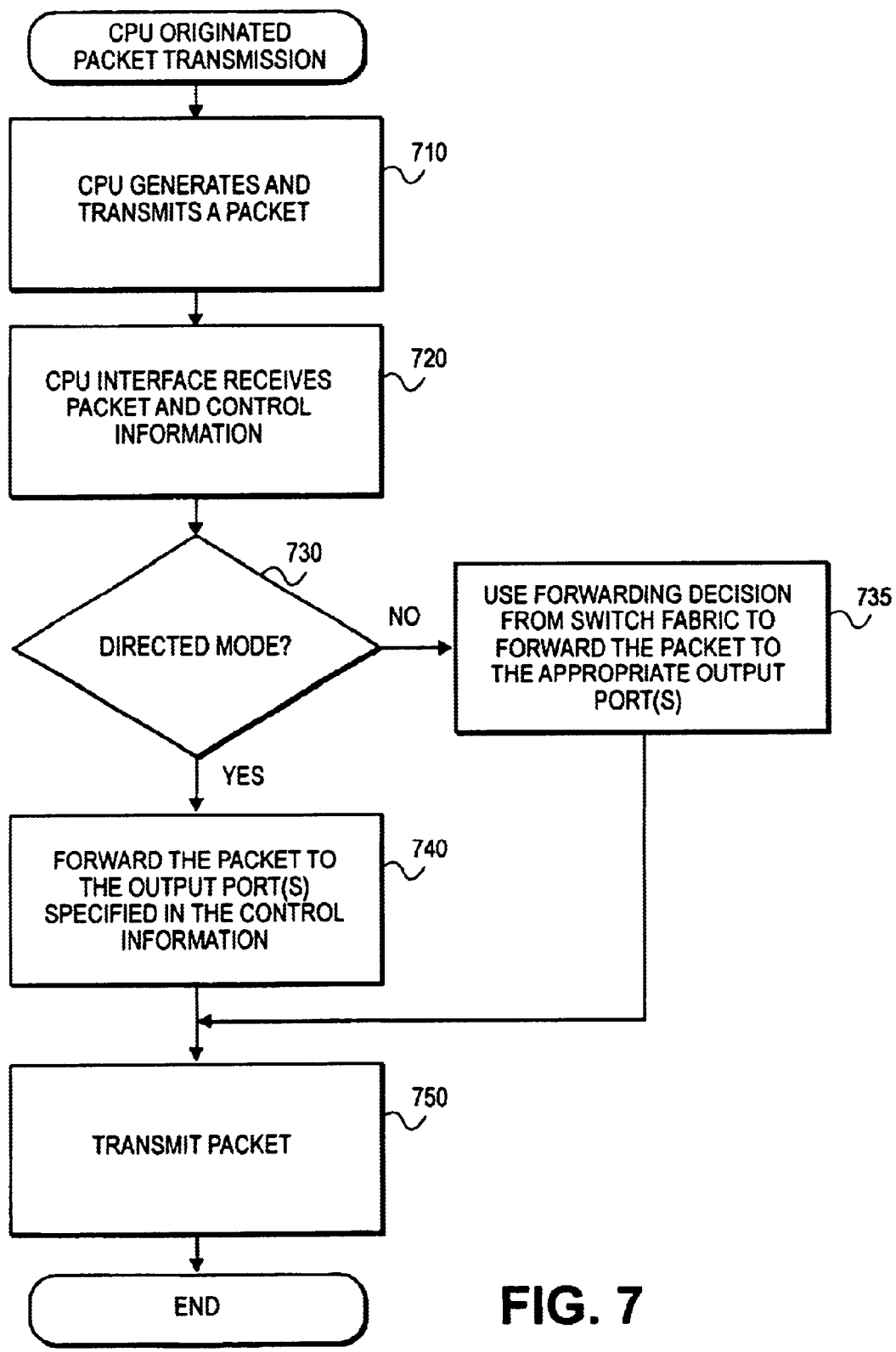
FIG. 7 is a flow diagram illustrating CPU originated packet transmission according to one embodiment of the present invention.

FIG. 7 is a flow diagram illustrating CPU originated packet transmission according to one embodiment of the present invention. Special CPU originated packets such as BPDUs need to be able to traverse a blocked port. BPDUs need to be exchanged among the devices acting as bridges within a network. Again, this is so even when a particular port has been blocked. Therefore, the present invention provides a method of transmitting packets, particularly BPDUs, through blocked ports without requiring special logic at each of the ports.

Packets generated by the CPU 261 are accompanied by control information. The control information may contain information about the packet to facilitate packet processing (e.g., forwarding or transfer) by the switch element 200. For example, a directed mode flag may be provided within the control information to indicate that the packet is to be sent to a specified output port. In this case, the typical packet header matching and forwarding database search will be skipped, and the packet will be transferred to the specified output port without reference to a forwarding decision from the switch fabric 310. It is appreciated that other flags and control information may also be incorporated into the control information.

Note, for purposes of this particular example, it is assumed that output filtering decisions are made in a centralized location such as the switch fabric 310, rather than at the individual output ports. Thus, the output ports are assumed to transmit any packets that are transferred to them.

At step 710, the CPU 261 generates a directed mode packet for transmission onto a specific output port. Typically, this packet will be a BPDU for support of a spanning tree-like protocol. However, importantly, the directed mode is not limited to transmission of BPDUs. Next, at step 720, the CPU interface 215 receives the packet and control information.

At step 730, CPU interface logic, with reference to the control information, determines whether the packet is a directed mode packet or a packet that is to be forwarded in the conventional manner (e.g., switched).

If the packet is determined to be a directed mode packet, then the packet is transferred to one or more output ports specified in the control information (step 740). Otherwise, the CPU interface logic requests a forwarding decision for the packet from the switch fabric 210 and, upon receipt of such forwarding decision, transfers the packet to the one or more output ports indicated therein (step 735). Regardless of the routing mechanism (e.g., control information associated with the packet or a forwarding decision from the switch fabric 310), at step 750, the packet is transmitted by the one or more output ports.

Spanning Tree States

Figure 8:
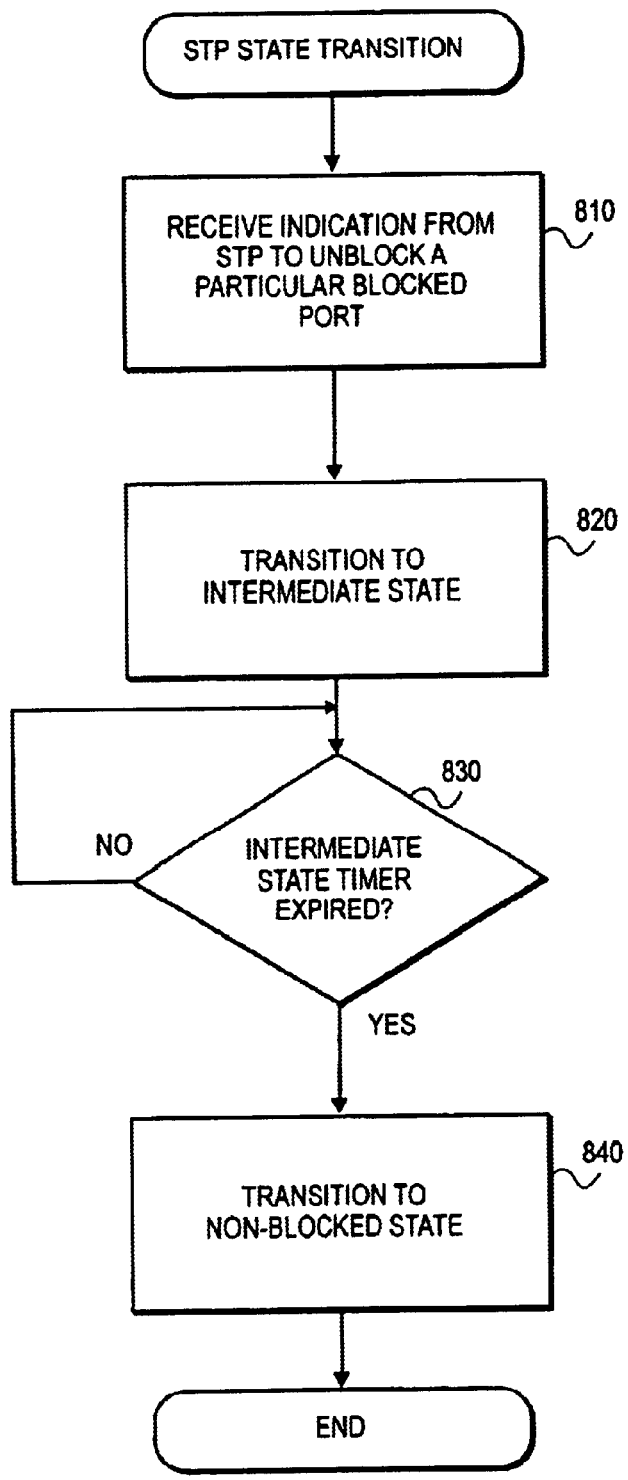
FIG. 8 is a flow diagram illustrating port transition from the blocked state to the non-blocked state according to one embodiment of the present invention.

Before discussing FIG. 8, the spanning tree states employed by the present invention will briefly be described. Spanning tree states for ports may include the following: (1) not blocked, (2) learn only, and (3) blocked.

In the "not blocked" or "non-blocked" state, input ports may freely forward received packets to appropriate output ports according to forwarding decisions received from the switch fabric 310, for example. Further, output ports may freely transmit outbound packets.

In the "learn only" state, input ports may perform Layer 2 learning, but received packets are filtered. However, packets arriving at the inbound port may be forwarded to the CPU. With the exception of directed mode packets (e.g., BPDUs), packet transmission on output ports is prohibited in this state.

In the "blocked" state, input ports received packets are filtered and no learning is performed. However, as above, packets arriving at the particular input port may be forwarded to the CPU for processing. Also, as above, packet transmission on output ports is generally prohibited except directed mode packets from the CPU 261.

State Transition

Referring now to FIG. 8, an exemplary method of transitioning a port from the blocked state to the non-blocked state will now be described. At step 810, an indication is received from a spanning tree process to unblock a particular blocked port. At step 820, rather than immediately transitioning to the non-blocked state, the port is put into an intermediate state in which learning may be performed, but in which transmission is still prohibited. The "learn only" state described above may be used, for example. It is appreciated that additional intermediate states may be provided.

At step 830, the port is kept in the intermediate learn only state for a predetermined amount of time. The predetermined amount of time may be determined with reference to network conditions such as traffic patterns, node distribution, etc. Those of ordinary skill in the art will be able to determine suitable time ranges for this intermediate state with reference to these and other network conditions. Finally, at step 840, the port is transitioned from the intermediate state to the non-blocked state.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. In a network having a least a first network device and a second network device, the first network device including at least a first post and a second port, the first port and the second port being combined to form one logical channel or trunk between the first network device and the second network device, a method comprising:

selecting the first port or the second port for participation in the loop-free topology discovery protocol;

executing the loop-free topology discovery protocol for the selected port;

if the loop-free topology discovery protocol indicates the selected port is to be unblocked, setting a state associated with the first port and the second port to a "learn" state, in which learning is permitted and forwarding remains inhibited, for a predetermined amount of time; and after the predetermined amount of time, setting the state associated with the first port and the second port to a "non-block" state, in which both learning and forwarding are permitted.

2. The method of claim 1, wherein the loop-free topology discovery protocol comprises the IEEE 802.1d Spanning Tree Protocol.

3. The method of claim 1, wherein receiving the indicator comprises:

selecting the first port or the second port for participation in the loop-free topology discovery protocol; and executing the loop-free topology discovery protocol for the selected port.

4. A method comprising:

a method of transitioning among states in response to a loop-free topology discovery protocol operating on a network device, the network device including a first port and a second port, the first port and the second port being combined to form one logical channel or trunk, the method comprising the steps of:

providing a set of states for association with the first port and the second port, the set states including a "blocked" state in which both learning and forwarding are inhibited, a "learn only" state, in which learning is permitted and forwarding remains inhibited, and a "non-blocked" state in which both learning and forwarding are permitted;

selecting the first port or the second port for participation in the loop-free topology discovery protocol;

executing the loop-free topology discovery protocol for the selected port;

if the loop-free topology discovery protocol indicates the selected port is to be unblocked, setting a state associated with the first port and the second port to the "learn only" state for a predetermined amount of time; and after the predetermined amount of time, setting the state associated with the first port and the second port to the "non-blocked" state.

5. The method of claim 4, further comprising:

if the loop-free topology discovery protocol indicates the selected port is to be blocked, then blocking both the first and the second ports.

6. The method of claim 4, wherein receiving the indicator comprises a spanning tree protocol.

7. The method of claim 4, wherein executing the loop-free protocol comprises:

preventing the second port from participating in the loop-free protocol.

\* \* \* \* \*